Jan. 1, 1924. 1,479,569
F. WAIDA
CANDY MACHINE
Filed Dec. 5, 1921 5 Sheets-Sheet 1

INVENTOR:
FRANK WAIDA
By: River O. Martin
HIS ATTORNEY

Jan. 1, 1924. 1,479,569
F. WAIDA
CANDY MACHINE
Filed Dec. 5, 1921 5 Sheets-Sheet 3

INVENTOR
FRANK WAIDA
By: Oliver O. Martin
HIS ATTORNEY

Jan. 1, 1924. 1,479,569
F. WAIDA
CANDY MACHINE
Filed Dec. 5, 1921 5 Sheets-Sheet 4

INVENTOR:
FRANK WAIDA
By Oliver O. Martin
HIS ATTORNEY

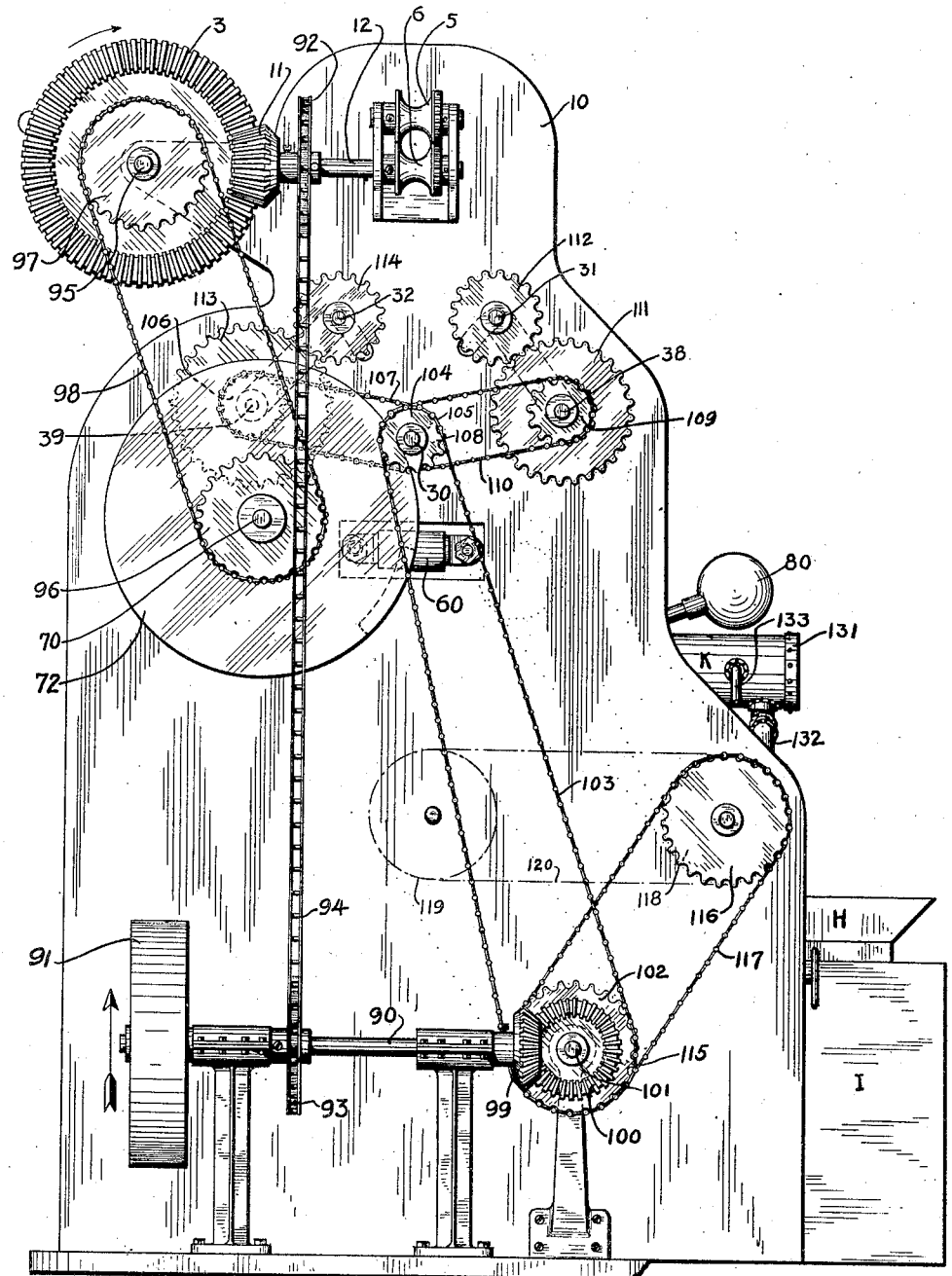

Patented Jan. 1, 1924.

1,479,569

UNITED STATES PATENT OFFICE.

FRANK WAIDA, OF CHICAGO, ILLINOIS, ASSIGNOR TO MARY A. WAIDA, OF CHICAGO, ILLINOIS.

CANDY MACHINE.

Application filed December 5, 1921. Serial No. 520,007.

*To all whom it may concern:*

Be it known that I, FRANK WAIDA, a citizen of the United States, residing at Chicago, in the county of Cook and State of Illinois, have invented new and useful Improvements in Candy Machines, of which the following is a specification.

This invention has relation to a machine for making candy, and it refers particularly to a machine for manufacturing pieces of candy of various shapes from a batch of candy dough.

The general object of the invention is to feed candy dough, in a semi-plastic state through forming devices, thereupon to flatten the separated pieces and deliver them to a drying table for hardening and packing.

To this end my invention consists in the various combinations hereinafter pointed out and described, and drawings are hereto annexed, in which structures illustrative of the invention are exhibited.

In the drawings:

Fig. 5 is a plan view of the machine, with the upper part removed.

Fig. 6 shows some of the cutting elements.

Figs. 7 and 8 show pieces of candy before and after flattening, and

Fig. 9 is a front elevation of the machine, indicating the various operating connections.

Figure 1:
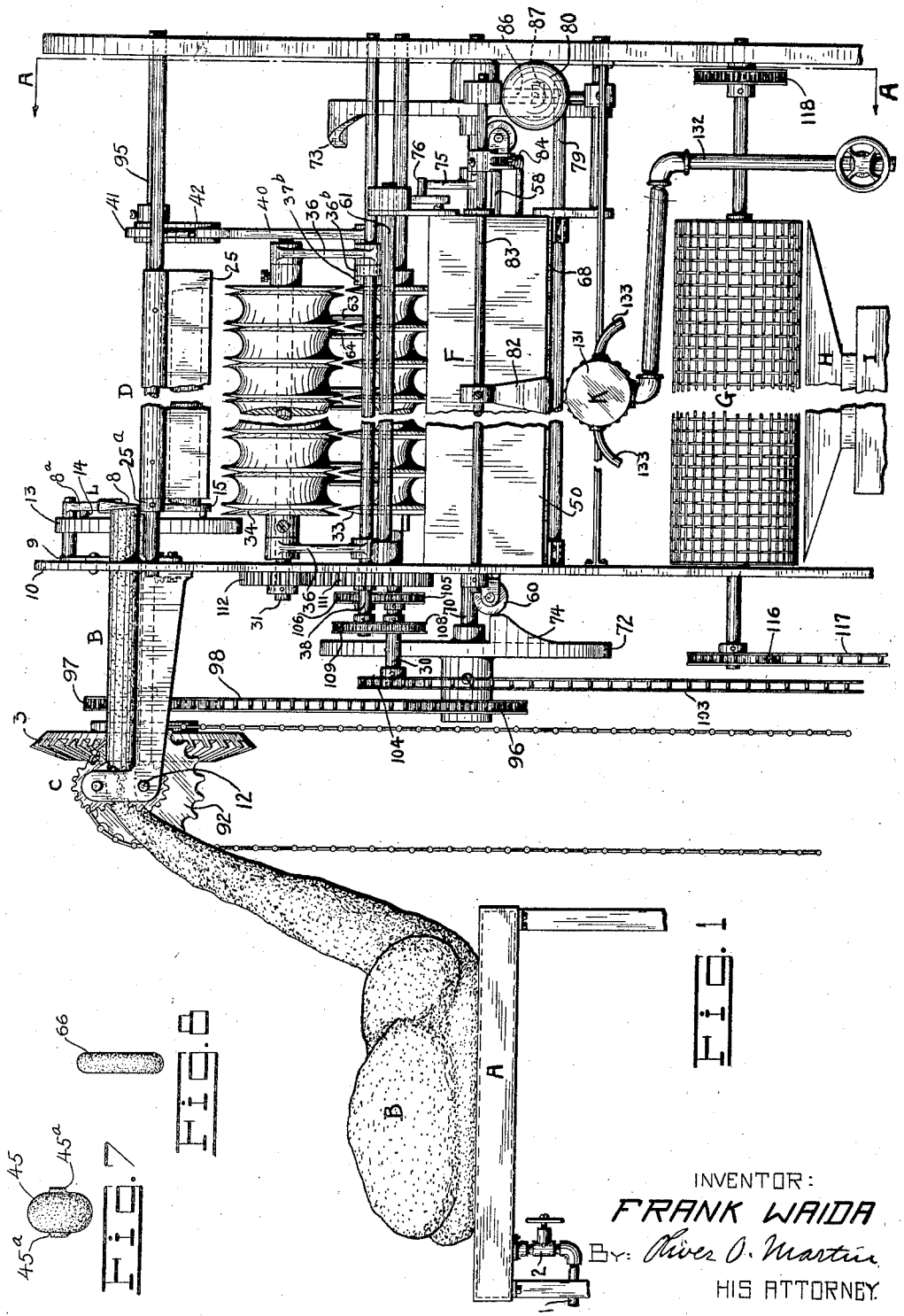
Fig. 1 shows in side elevation a machine of the type above referred to, and the important features of the invention are embodied in this machine.

Generally speaking, the machine of my invention comprises a table A, capable of receiving a batch of candy dough B, which by the means of suitable feeding and forming devices C, is delivered into a trough D, in the shape of a semi-plastic stick B, which when a predetermined length is reached, becomes separated from the batch by suitable cutting means L. Below the trough is mounted a plurality of cutting wheels E, through which the stick passes, and in which it is cut into pieces of uniform size and shape, thence to drop into a flattening device F. Means is provided in the latter, for pressing each piece of candy to a desired thickness, whereupon the pressure on the pieces again is released and the candy permitted to drop on to the conveyor G, and this conveyor is kept constantly or intermittently moving for the purpose of carrying the pieces forward to a hopper H, through which the pieces finally are discharged into a suitable receptacle I. Above the conveyor is placed a ventilating system K, through which dry and heated air is blown and distributed over the surface of the conveyor for the purpose of hardening the candy and also in order to remove all dust and fragments, which may gather in the machine and drop on the conveyor.

The foregoing brief description sets forth the scope of my invention. It is noticed that candy constantly is drawn from the batch on the table and that it finally is delivered, correctly shaped and properly cleaned in receptacles for storage, bulk shipment, or for transfer to fancy boxes for retailing.

Candy dough hardens very quickly, and becomes quite brittle in hardening. For this reason it is desirable to heat the surface of the table A, on which the candy dough is placed, and to this end the table may conveniently be made hollow, and a pipe line, from a steam generator (not shown), is caused to open into the space within the table. A valve 2, or other suitable regulating means, may conveniently be introduced for the purpose of maintaining the top of the table at a temperature suitable to keep the batch in a plastic state.

An operator will be stationed at the table for the purpose of maintaining a batch on the table and in order to feed the candy to the forming devices C. The said devices may conveniently comprise a plurality of rollers 5, 6, having grooves of substantially semi-circular shape, as a result of which a substantially cylindrical stick of candy B, is caused to flow from said rollers and into the trough D. The cutting means L is shown mounted at the receiving end of the trough, and it comprises a knife 8, which is pivotally hung in a bracket 9, of the machine frame 10. The movement of this knife is properly timed relative to the rotations of the rollers 5, 6, by suitable means, and such means may take the shape of a beveled pinion 11, of the roller drive shaft 12, which pinion constantly is in mesh with a much larger beveled gear-wheel 3, in the face of a disk 13, is cut an eccentric cam groove 13ª, and this groove is shaped to receive a stud 14, which in turn is rigid on the tail end 8ª, of the knife lever 8. The rollers 5, 6, are caused to rotate continuously, in a manner which will be described presently, and as the gear 3, is mounted to rotate in a stationary bracket 10ª, and constantly in mesh with the pinion 11, it is seen that continuous rotation will be transmitted to the said gear 3. It is important to note that a certain relation exists between the size of the rollers 5, 6, and the sizes of the said gear wheels. If, for example, the circumference of the rollers is equal to one third the distance across the trough D, it is to be remembered that the diameter of the gear 3, must be three times as great as the diameter of the pinion 11, in order that the stick of candy may be cut off when it has attained a length substantially equal to the length of the trough.

Figure 3:
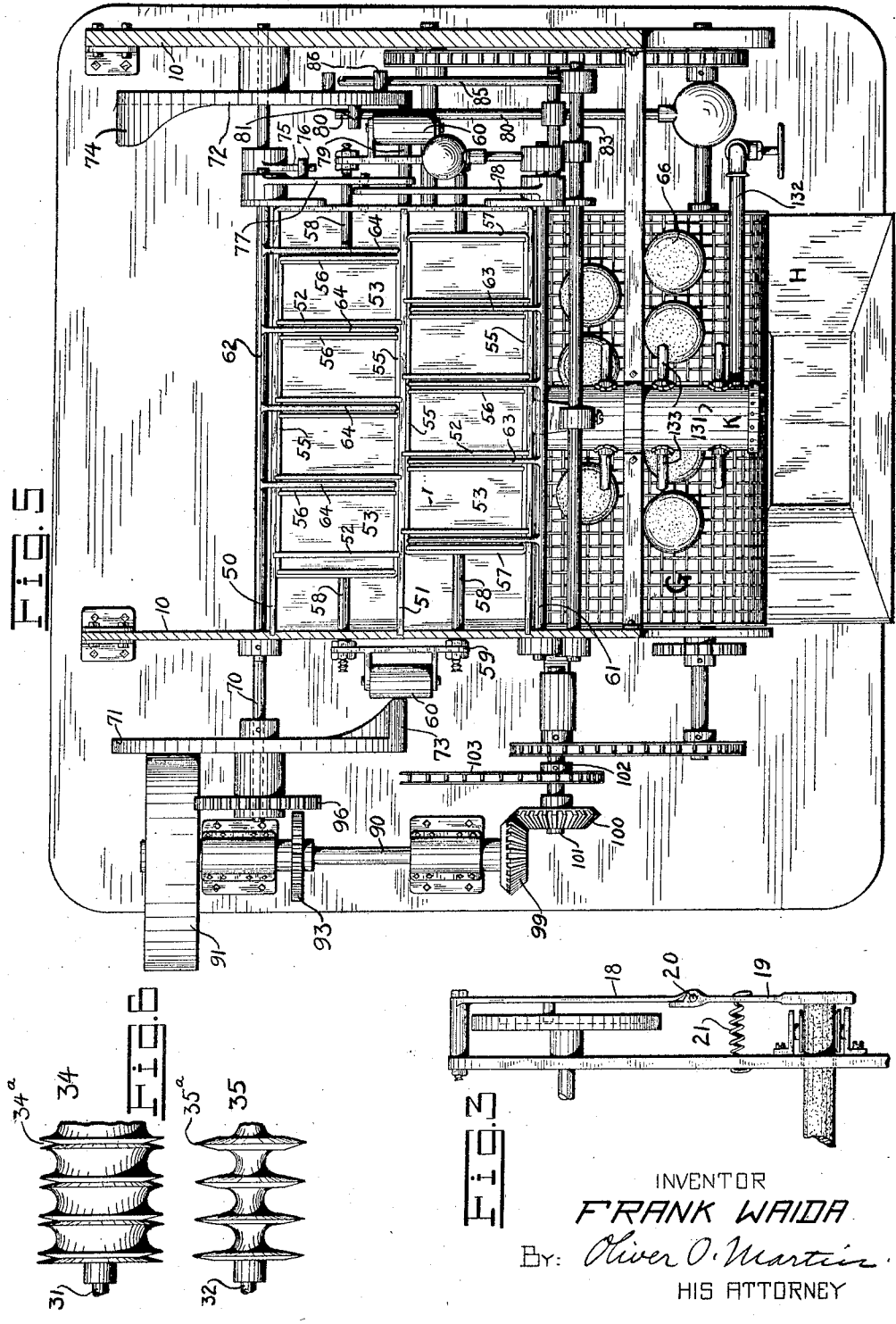
Fig. 3 is a fragmentary view showing certain cutting elements of the device.

The knife is shown positively oscillated, which is the preferred construction because of its simplicity and reliability. It may be found, however, that the candy, which continues to advance while the knife is performing the cutting operation becomes arrested against the side of the knife, so that for a short time it cannot move forward. The result will be that the rollers 5, 6, will slip on the candy until the obstruction is removed, whereupon the forward feeding of the candy is continued. If, however, it is desired not to interrupt this advance movement, it is not difficult to provide means whereby to allow the knife to yield sidewise, as indicated in Fig. 3. In this case the knife lever is made in two parts 18, 19, which are hinged together to turn on a pin 20. A resilient member 21, serves to maintain the parts yieldingly in line, as shown, and it is readily seen that the cutting member 19, is free to yield against the pressure of the spring 21. Of course, much more elaborate and very quick acting cutting means may be introduced, and the foregoing merely serves to illustrate, that suitable cutting means can be introduced at this point.

The separated stick of candy now falls into the trough D. The latter comprises two leaves 25, 26, which normally converge toward the bottom, forming the V-shaped trough shown in the drawing. It is noticed that the leaf 26 is made with an arm 15, which extends outward, and which is shaped at the outer end to ride in the cam groove 13ª, of the cam 13. The two leaves are operatively interconnected by arms 25ª, 26ª. The cam 13, traveling in the direction of the arrow, first operates upon the knife to cut off a stick of candy, whereupon the arm 15 of the leaf 26 comes into contact with the active portion of the cam groove 13ª, as a result of which the leaves 25, 26, are caused to swing apart, permitting the stick of candy to drop into the space between the cutting wheel E. The latter mechanism comprises three shafts 30, 31, 32, to each of which is rigidly secured a series of cutting wheels 33, 34, 35. The shaft 30 may be mounted to rotate in stationary bearings of the machine frame, while the shafts 31, 32, preferably are hung on oscillatory frames 36, 37, which in turn are hung on shafts 38 and 39. The arm 37 is made with an arm 37ª, the outer end of which is perforated to receive a connecting rod 40, and this rod terminates at the top in an eccentric strap 41, which latter in turn rides on an eccentric cam 42 of the form roller drive shaft 95.

After the stick of candy has dropped into the space between the cutting wheels it is found that the eccentric 42 commences to operate upon the parts described to draw the cutting wheels 34, 35 together and toward the third cutting wheels 33, for the reason that the said wheels are operatively interconnected, as by a pair of arms 36ᵇ, 37ᵇ, one of which is provided with a stud 38ª riding in an elongated perforation of the other arm. The wheels 34, 35 must not only come together until their outer peripheries touch, but the movement must be continued until one wheel overlaps the other sufficiently to cut entirely through the stick of candy, substantially as indicated in dotted outline in the drawings. The afore-named wheels simultaneously approach the wheel 33, as already mentioned, and they are caused to come to a stop just before the peripheries of the two wheels touch the periphery of the third wheel 33. If the overlapping edges of the wheels are made very thin it is possible to permit all three wheels to overlap each other, but it is not found necessary. Referring to Fig. 6, it is noticed that I prefer to make the wheels 34 with fine peripheral grooves 34ª, and the wheels 35 with very thin cutting edges 35ª, capable of entering into said grooves. Candy in a semi-plastic state is very tough and is difficult to cut, and each piece must be entirely severed from the adjoining pieces, or the pieces will not fall apart. If both sets of wheels have a single edge, such as the wheels 35, I have found that a thin film of the dough will form between the overlapping edges, causing a lateral spreading of the edges, and this film is sufficient to bind the pieces together. Furthermore, it is well to note that there may be fifty or more cutting wheels on each shaft, and that it is a difficult and expensive matter to make and assemble all of these wheels so perfectly, mechanically, that the overlapping pair of wheels fit together like the blades of a pair of scissors. But by adopting the construction herein shown, having the thin edge of one wheel enter a fine groove of the other, I find that the single edged wheel is guided between the edges of the grooved wheel, and that no great precision in making and assembling the parts is required.

After the stick has been cut up into pieces, as described, the wheels again commence to separate, and having become separated, space is provided through which the pieces may drop into the flattening device F. If the cutting wheels are of the shape shown, it will be observed that the separated pieces 45 take substantially the shape shown in Fig. 7, and these pieces drop into the compartments of the device F. The latter structure is in Fig. 5 of the drawings shown to consist of a rectangular casing 50, having longitudinally therethrough a stationary partition 51. The two chambers thus produced are again through the medium of a series of partitions 52, divided into a number of equal compartments 53. In each partition 52 is cut shallow grooves 52ª, along both vertical edges, and the function of these grooves is to make room for the side pieces 55 of a pair of slidable frames 54 which in turn are provided with corresponding series of stationary partitions 56. The said frames are at the ends combined by suitable plates 57, from each of which extends a rod 58, and all four rods pass through the ends of the casing, two at each end. The outer extremities of each pair of rods are suitably combined, as by a bar 59, which bar serves to support a rotatable roller 60. Instrumentalities, which will later be described, operate upon said rollers to slide the frames back and forth within the casing in a certain timed relation to the mechanisms hereinbefore described. As shown in Fig. 5, the frames are first pushed to one end, causing the partitions 56 of the frames to abut the partitions 52 of the casing, thereby leaving two series of open compartments into which the candy pieces are free to drop. It is now noticed that these compartments are arranged in staggered relation, that is to say, the abutting pairs of partitions on one side take a position opposite the center of the compartments of the other side. This staggered construction is resorted to in order to provide as many compartments as there are pieces of candy falling from the cutting wheels, furthermore in order to provide room within each compartment for one piece of candy; and lastly in order that there may be one compartment below and in line with the space between each pair of cutting wheels.

Figure 2:
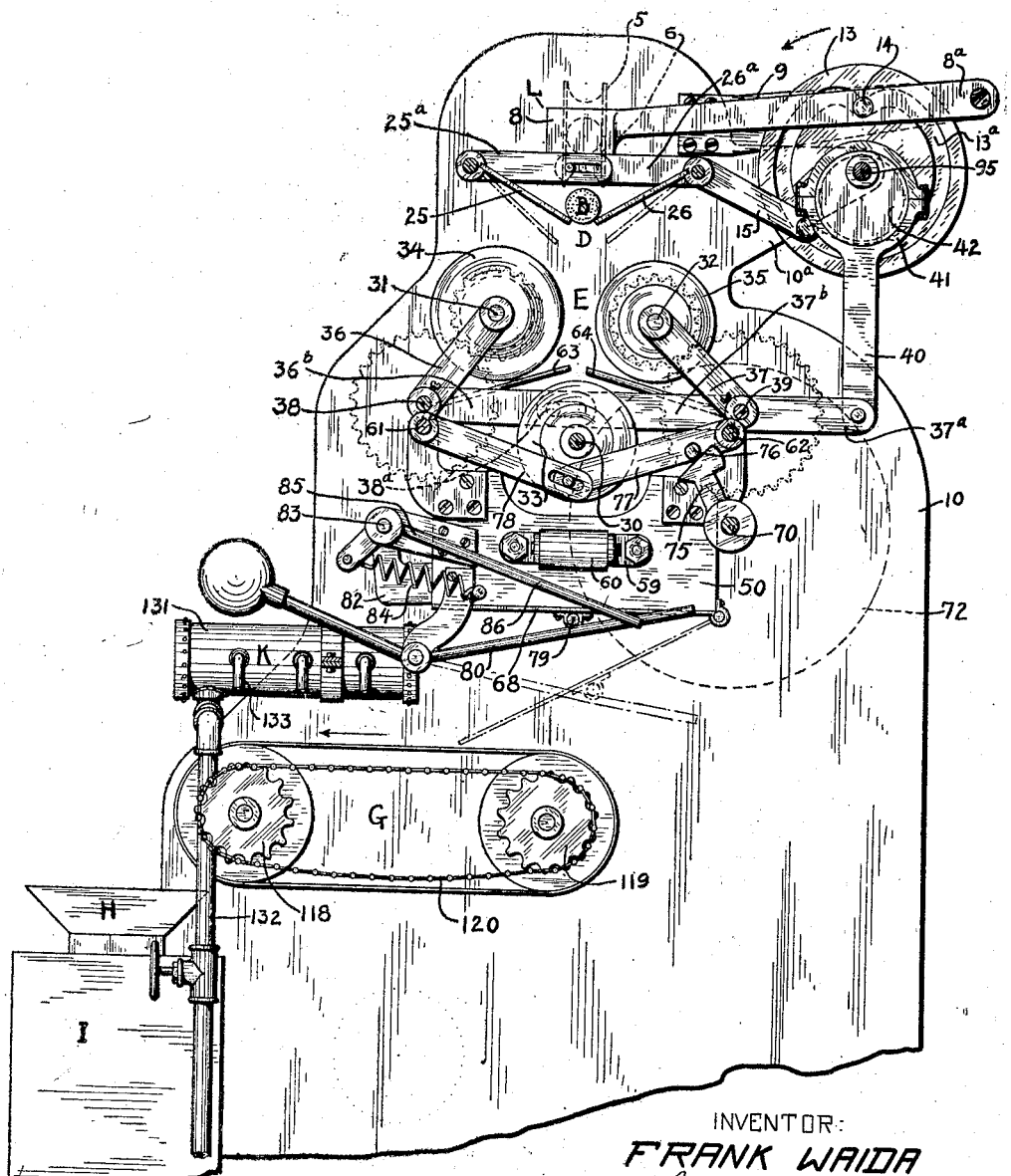
Fig. 2 is a sectional elevation taken substantially on a line A—A of Fig. 1, looking in direction of the arrow.

Attention is now called to means for directing the pieces, coming from the cutting wheels, into the alined compartments. Such means are illustrated in the drawing and best seen in Figs. 2 and 4. On each side of the casing 50 is supported an oscillatory shaft 61, 62, and from each shaft extends a series of fingers 63, 64 toward the center of the cutting wheel shaft 30. There is one finger for each cutting wheel space, and these fingers are also mounted in staggered relation. After the candy stick is cut through, the cutting wheels commence to draw apart, as has been stated, and simultaneously the fingers 63, 64 begin to rise into the path of the pieces which have been cut off, and now would be free to drop either to the right or left, were it not for the fingers which direct the pieces alternately right and left, as shown in Fig. 2. As the pieces may have a tendency to stick in the grooves of the wheels, it is well to position the fingers so that they will not only prevent the pieces from rolling and dropping in the wrong direction, but that they will also positively start the pieces moving in the proper direction. To make this point clear, attention is directed to Fig. 4, in which the candy stick is shown cut through, and the fingers 63, 64 are in their downmost position. Let now the cutting wheels commence to separate and the fingers to rise. It is readily seen by those versed in the art that the end of each finger, in rising, will strike the periphery of a piece of candy and will push it forward a little, sufficiently to direct it to its compartment in the flattening device, and also to twist it loose, in case it binds in a groove.

Now the candy pieces have been deposited one in each compartment of the flattening device F, and quickly the frames 54 commence to slide longitudinally within the casing 50, causing the frame partitions 56 to withdraw from the abutting casing partitions 52 and to approach and press the adjacent pieces of candy against the next following casing partitions. Means are provided controlling the extent of sliding movement of said frames, in order that the pieces of candy may be pressed to a desired thickness. In order to illustrate such means I have provided the ends of the rods 58 with screw threads, and a pair of threaded nuts are caused to engage each threaded end. These nuts operate to maintain the bars 59 in position on the rods, and it is seen by those skilled in the art, that the rollers 60 may be lengthwise adjusted relative to the supporting rods by means of these threaded nuts. In this manner the throw of the frame partitions may be varied, so as to press the candy pieces to any desired thickness. In Fig. 8 is shown such a piece of candy 66, as it appears after the flattening operation, and a comparison of this article with the unflattened piece of 45, of Fig. 7, is invited. It is noticed that pronounced projections 45ª appear on the latter, which projections represent the imperfections in the cutting wheels, imperfections which those versed in the art will recognize as commercially unavoidable. And it is important to note that these projections have entirely disappeared in the pressed article 66.

Figure 4:
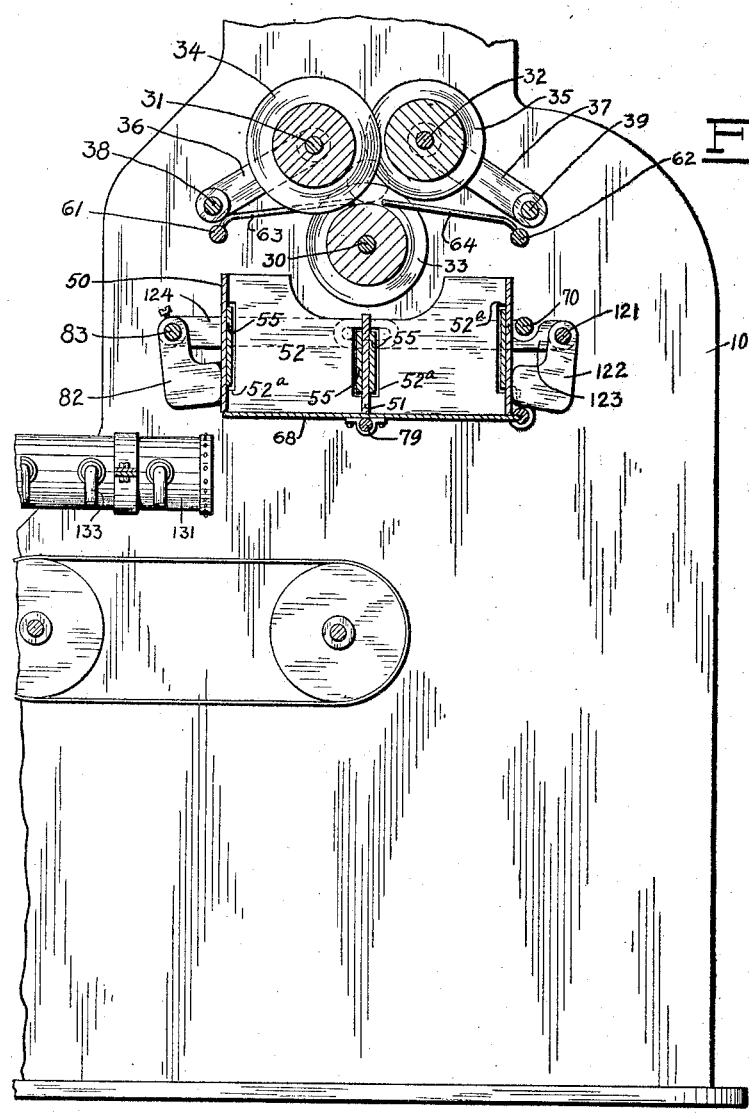
Fig. 4 illustrates, in sectional elevation, the flattening elements of the machine.

It remains now to remove the pressed candy from the casing 50, and this may be accomplished in various ways, one of which is to permit the casing bottom 68 to swing open, whereupon the candy drops out, substantially as indicated in dotted outline in Fig. 4. From the inclined surface of the bottom plate 68 the candy rolls on to the conveyor G, which carries the pieces to the receptacle I, as hereinbefore mentioned.

For the purpose of operating the flattening device F, a shaft 70 is mounted to rotate on the side of the casing 50 and positioned in parallel relation to the casing, longitudinally. To the ends of this shaft are secured two discs 71 and 72, each of which carries an inclined member 73, 74, which members are alined to engage the rollers 60, thereby to oscillate the sliding frames 54 within the casing 50. The said cams are shown mounted diametrally opposite on the two discs, and as the discs make one rotation it is noticed that the frames 54 first are pushed forward by the cam 74, whereupon it is returned to its initial position by the cam 73. In other words, the operation of closing the pressing means to shape the candy pieces and of reopening said means to release the pieces, is completed in one revolution of the discs.

On the shaft 70 is rigidly secured a segmental arm 75 which, in its course of travel, reaches a pin 76 of an arm 77, and raises the arm sufficiently so that the fingers 64 engage the separated candy pieces within the cutting wheels. The fingers 63, 64 are suitably interconnected, as by a pair of co-operating arms 77, 78, in order that both fingers may rise simultaneously by and to the correct position for discharging the candy pieces.

The casing bottom 68 is shown hinged at one longitudinal bottom edge of the casing, and it is noticed that it is made with a centrally positioned rod 79 parallel with its hinge rod. This rod projects outside the casing at one end and its projecting end engaged by a weighted lever 80 operating to maintain the casing yieldingly closed. The inner end of the lever 80 is positioned in the path of a stud 81 of the disc 72, and this stud is in such peripheral relation to the cam 73 that it commences to depress the lever 80 at the same time or directly after the said cam 73 engages the roller 60 to release the pressure on the candy pieces.

There is a possibility of candy pieces, or some individual piece, adhering to the partitions of the casing and frames, but the tendency is so slight that a light tap on the casing is sufficient to shake such piece or pieces loose. Means should be provided for imparting such light blows to the casing, and such means may take the form of a hammer 82 secured on a rock-shaft 83 and normally maintained in engagement with the side of the casing by a resilient member 84. On the front end of the rock-shaft 83 is mounted an arm 85, which extends across the end of the casing 50 and into the path of travel of a stud 86 of disc 71. This stud may well be substantially in line with the stud 81 of the disc 72, in order that a blow may be imparted every time the partitions within the casing commence to separate to release the candy pieces. It may be found desirable to repeat the blow, and this may readily be done by mounting a second stud 87 a short distance behind the first stud 86.

It is required, of course, to provide some means for imparting movement to the various mechanical instrumentalities combining to form the structure of my invention, and such driving means must be designed and calculated to move all the members of the structure in the proper time relation. In Fig. 9 driving conections are presented, illustrative of such timed relation. Near the bottom of the machine frame 10 is mounted a drive shaft 90 having a pulley 91 for connection with a prime mover. Adjacent to this pulley is a sprocket wheel 93 which, through the medium of a chain 94 is connected to operate a sprocket wheel 92 of the roller shaft 12. In order to maintain the relations hereinbefore suggested, the beveled pinion 11 is affixed said shaft and positioned to mesh with the three times larger bevel gear wheel 3. On the shaft 95 of said wheel, and on the shaft 70 of the frame oscillating discs are mounted sprocket wheels 96, 97, both of the same diameter and connected for simultaneous rotation by a chain 98, whereby the discs and bevel gear are caused to rotate at the same speed. On the end of the drive shaft 90 is secured a bevel gear 99, which meshes with a bevel gear 100 of a jack-shaft 101. Adjacent to the gear 100 is a sprocket wheel 102 over which is hung a chain 103 which transmits rotation to a sprocket wheel 104 of the cutting wheel shaft 30. The latter is, in turn, connected to rotate the shafts 31 and 32, through the medium of sprocket wheels 105, 106 and an interconnecting chain 107, and similar wheels 108, 109, which are connected for simultaneous rotation by a chain 110, and intermeshing gears 111, 112 and 113, 114. Adjacent to the sprocket wheel 102 is mounted a similar sprocket 115 which, through the medium of a chain 117 is connected to rotate a sprocket 116. The latter is mounted to turn a drum 118, from which a conveyor belt 120 extends over a second drum 119. These instrumentalities combine to form the hereinbefore mentioned conveyor mechanism G.

It is necessary, also, to provide a candy drying apparatus, particularly in climates where the humidity is pronounced. Such apparatus may well take the form hereinbefore suggested, and shown to comprise an air chamber 131 suitably connected, through a pipe line 132, with an air blower (not shown). From this chamber extends a series of nozzles 133, through which air is directed to the top of the conveyer, on which the candy pieces are carried away from the pressing device. The air must be dry, and in cold weather it may be slightly heated, although this is not necessary. And it must be delivered with sufficient force to blow away all dust and fragments which may adhere to the candy. It is customary in candy drying conveyers, to use a perforated metal conveyer belt, a belt of woven wire cloth, or even a chain belt, and such structures are very desirable because all foreign matter gathering on and around the candy is blown directly through the belt.

Hereinbefore reference was made to means for tapping the casing of the flattening devices in order to shake loose such pieces of candy as may adhere to the sides of the flattening compartments. A hammer 82 was shown introduced for this purpose and applied to one side of said casing. Of course, I may employ more than one hammer, and hammers on more than one side of the casing. This condition is illustrated in Fig. 4, where one or more additional hammers 122 are secured on a rock-shaft 121, which latter in turn, through the medium of links 123, 124, is connected to be operated from the rock-shaft 83.

It has been my aim, in the foregoing description, to indicate combinations of movements illustrative of the purpose of my invention. And for the sake of conciseness, and in order not to confuse the reader, I have found it necessary to confine myself to certain shapes, and types of mechanical movements. But I wish to state that my invention is not limited to the specific constructions shown and described, and that I may adopt such modification as will add to the effectiveness and commercial value of the device, so long as I remain within the scope of the claims hereto annexed.

I claim:

1. In a candy machine, the combination with means for continuously feeding candy into the machine, of yielding means for cutting the inflowing candy into sticks substantially the length of the machine, means for cutting the candy into pieces of uniform size, and adjustable means for pressing said pieces to uniform thickness.

2. In a candy machine, the combination with cutter controlling means, means operated by said controlling means to cut the incoming candy into sticks, means also operated by the controlling means temporarily to support each stick, means receiving the sticks and cutting them into pieces of uniform size, of adjustable means for flattening the pieces, after cutting, to a desired thickness.

3. In a candy machine, in combination, means for feeding a constant supply of candy dough into the machine in the form of a stick, yielding means for severing the stick when a predetermined length is reached, means for cutting up the stick into pieces of uniform size, and adjustable means for flattening each piece to a uniform thickness.

4. In a candy machine, a rotating controlling device, means operated by said device to cut incoming candy into sticks, means operated by the device to support each stick temporarily, means adjustable by the device to receive the stick from said supporting means and readjustable thereby to cut up candy in pieces of uniform size, adjustable means for flattening said pieces to a desired thickness, and means for delivering the said pieces to suitable receptacles.

5. In a candy machine, a rotating member, a series of cutters fixed to rotate continuously, two series of rollers adjustable by said member and co-operating with the fixed rollers to cut candy into pieces of uniform thickness, means operated by said member to support and guide the candy to said cutters, adjustable means for flattening the pieces to a uniform thickness, means for delivering said pieces to suitable receptacles, and means for cleaning the pieces before they enter said receptacles.

6. In a candy machine, the combination with means for feeding a constant stream of candy in semi-plastic form into the machine, means yieldable to the advancing stream and capable of cutting the stream into sticks of predetermined length while thus yielding, means for separating each stick into pieces of uniform size and shape, means adjustable to press the separated pieces to predetermined uniform thicknesses and means for delivering the pieces to suitable receptacles.

7. In a candy machine, a table holding a batch of dough from which a constant stream is fed into the machine, means for forming said stream into a stick of a desired cross-sectional shape, yielding means for severing the stick from the stream intermittently, means for cutting the stick up into pieces of uniform length, and adjustable means for flattening said pieces to a uniform thickness.

8. In a candy machine, a table for holding a batch of candy dough, means for maintaining said table at a uniform temperature, means for drawing a stream of dough from said batch and into the machine, yielding means cutting the incoming candy into sticks of uniform length, means separating it into pieces of uniform size and shape, means for flattening the pieces to any desired uniform thickness, means for carrying the finished pieces to a suitable receptacle, and means for hardening and cleaning said pieces in transit.

9. In a candy machine, a driven shaft, a cam rigid on said shaft, means feeding a string of candy into the machine, means operated by said cam to cut the string into sticks, means operated by the same cam temporarily to support and then release each stick, an eccentric on said shaft, rotating cutters movable by said eccentric to receive the stick from the support and to cut it into uniform pieces, and means adjustable to press said pieces to a desired thickness.

10. In a candy machine, means for feeding a stream of candy dough into the machine, yielding means for cutting said stream into sticks of a uniform length, means for cutting each stick into pieces of uniform length, adjustable means for flattening the pieces after cutting, and power operated means transmitting motion to the operating means of the machine in the proper speed relation.

11. In a candy machine, means feeding a continuous string of candy into the machine, an oscillating knife operated to cut the string into sticks of uniform length, the arm of said knife made in two parts pivotally joined, whereby the knife during its oscillating movement is capable of following the forward movement of the candy, and a spring yieldingly opposing such movement of the knife by the candy.

12. The combination with yielding means for cutting a constant stream of candy into sticks of uniform length, of means for sub-dividing said sticks into pieces of uniform length, adjustable means for flattening said pieces endwise to remove the burrs, and means connected with a prime mover and capable of actuating the aforenamed means in the proper time relation.

13. In a candy machine, means for delivering a constant stream of candy to the machine, receiving means for the advancing candy, means for cutting the stream at timed intervals, means for dividing the stick thus cut off into equal parts, adjustable means for pressing said parts endwise to a uniform thickness, driving means, and means actuated by the latter and timed to release said receiving means to discharge said stick to the said dividing means.

14. In a candy machine, means depositing sticks of candy from a batch outside the machine, three sets of cutting wheels inter-geared for simultaneous rotation and arranged in triangular form, the lower set of wheels fixed to rotate in the machine frame, the two upper sets supported on swinging arms, a power driven eccentric connected to swing said upper wheels out and in to receive and cut said sticks into uniform pieces, and adjustable means pressing said pieces to a desired thickness.

15. In a candy machine, a rotating disc provided with a cam groove, a knife for cutting a stream of candy into sticks, said knife made with a pin seated in said grooves for the purpose of oscillating the knife to cut the candy, a support for the incoming candy, said support having a pin entering the groove, whereby the support is opened the moment the knife cuts the candy, means dividing the candy into small equal parts, and means pressing the parts to uniform thickness.

In testimony whereof I have hereunto affixed my signature.

FRANK WAIDA.